United States Patent [19]
Sasaki

[11] Patent Number: 6,028,702
[45] Date of Patent: *Feb. 22, 2000

[54] OPTICAL ISOLATOR

[75] Inventor: Takashi Sasaki, Yokohama, Japan

[73] Assignee: Sumitomo Electric Industries, Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/544,406

[22] Filed: Oct. 10, 1995

[30] Foreign Application Priority Data

Oct. 11, 1994 [JP] Japan .................................. 6-244493
Mar. 29, 1995 [JP] Japan .................................. 7-071391

[51] Int. Cl.⁷ .................................................. G02B 5/30
[52] U.S. Cl. ......................... 359/484; 359/494; 359/497; 372/703
[58] Field of Search ................................. 359/484, 494, 359/495, 497, 281, 282; 372/703

[56] References Cited

U.S. PATENT DOCUMENTS

| | | | |
|---|---|---|---|
| 4,974,944 | 12/1990 | Chang | 359/497 |
| 5,105,307 | 4/1992 | Nishiyama et al. | 359/484 |
| 5,151,955 | 9/1992 | Ohta et al. | 359/282 |
| 5,161,049 | 11/1992 | Tanno et al. | 359/484 |
| 5,262,892 | 11/1993 | Nakamura | 359/484 |
| 5,278,853 | 1/1994 | Shirai et al. | 372/703 |
| 5,315,431 | 5/1994 | Masuda et al. | 372/703 |
| 5,341,235 | 8/1994 | Watanabe et al. | 359/484 |
| 5,375,009 | 12/1994 | Otani et al. | 359/484 |
| 5,408,491 | 4/1995 | Hirai et al. | 359/484 |
| 5,479,290 | 12/1995 | Tanno et al. | 359/484 |

FOREIGN PATENT DOCUMENTS

| | | | |
|---|---|---|---|
| 0364968 | 4/1990 | European Pat. Off. | |
| 0533398 | 3/1993 | European Pat. Off. | |
| 0611980 | 8/1994 | European Pat. Off. | |
| 0615145 | 9/1994 | European Pat. Off. | |
| 0079721 | 3/1989 | Japan | 359/484 |
| 0272419 | 11/1990 | Japan | 372/703 |
| 0137616 | 6/1991 | Japan | 372/703 |
| 3245118 | 10/1991 | Japan | |
| 4032816 | 2/1992 | Japan | 372/703 |
| 4093814 | 3/1992 | Japan | |
| 4264514 | 9/1992 | Japan | 372/703 |
| 4264515 | 9/1992 | Japan | |
| 5173090 | 7/1993 | Japan | 372/703 |
| 6194604 | 7/1994 | Japan | |
| 6-242403 | 9/1994 | Japan | |

OTHER PUBLICATIONS

The Electric Information Transmission Society: Proceeding 905, vol. J73–C–I, No. 5, 1990. pp. 323–331.

Primary Examiner—Ricky D. Shafer
Attorney, Agent, or Firm—Smith, Gambrell & Russell, LLP

[57] ABSTRACT

The present invention relates to an optical isolator having a plurality of Faraday rotators with a structure, which allows an accurate and easy assembly.

The optical isolator relating to the present invention, includes: an optical isolator unit having a plurality of optical elements which have Faraday rotators and birefringent crystal plates arranged on both sides of the each rotator; a plurality of magnets arranged on the circumference of the Faraday rotators for magnetizing the Faraday rotators; and a housing body arranged on the circumference of the plurality of magnets, the plurality of magnets being integrally formed, and the optical isolating unit being integrally fixed with the integrally formed magnets.

9 Claims, 6 Drawing Sheets

OPTICAL ISOLATOR

BACKGROUND OF THE INVENTION

1. Field of the Invention

The present invention relates to an optical isolator having a structure which allows accurate and easy assembling.

2. Description of the Background Art

The conventional optical isolator as shown in FIG. 10, for instance, provides respective birefringent crystal plates, 1A, 3A, 1B and 3B,each on both sides of Faraday rotators, 2A and 2B, and magnets 20 are provided on Faraday rotators' circumference [Japanese Patent Laying-Open No. 6-242403 (1994)]. Lenses 21A and 21B, and optical fibers, 22A and 22B, are provided on the both sides of the optical isolator.

When one Faraday rotator is provided, the isolation of the optical isolator is at the highest, about 40 dB . On the other hand, when a plurality of Faraday rotators are provided, the isolation of the optical isolator is further improved (The Electronic Information Transmission Society: Proceeding 90/5 Vol. J73-C-1 No. 5).

In order to manufacture an optical isolator having a plurality of Faraday rotators, assembly must be accurately made of many optical elements and must be small. Further, a plurality of magnets must be assembled into optical isolator accurately and easily. Reciprocation action between magnets makes changeful the position of magnets. It makes more difficult the adjustment of magnets and Faraday rotators and the fixation a main body's optical isolator on a housing body.

SUMMARY OF THE INVENTION

The purpose of the present invention is to provide an optical isolator structured to allow a plurality of magnets being assembled into the optical isolator accurately and easily.

The optical isolator relating to the present invention, includes: an optical isolator unit having a plurality of optical elements which have Faraday rotators and birefringent crystal plates arranged on both sides of the each rotator; a plurality of magnets arranged on the circumference of the Faraday rotators for magnetizing the Faraday rotators; and a housing body arranged on the circumference of the plurality of magnets, the plurality of magnets being integrally formed and the optical isolator unit being integrally fixed with the integrally formed magnets.

According to the above structure, the assembling of a plurality of magnets into an optical isolator can be simplified, thereby allowing accurate and easy assembling.

DESCRIPTION OF THE PREFERRED EMBODIMENT

Figure 1:
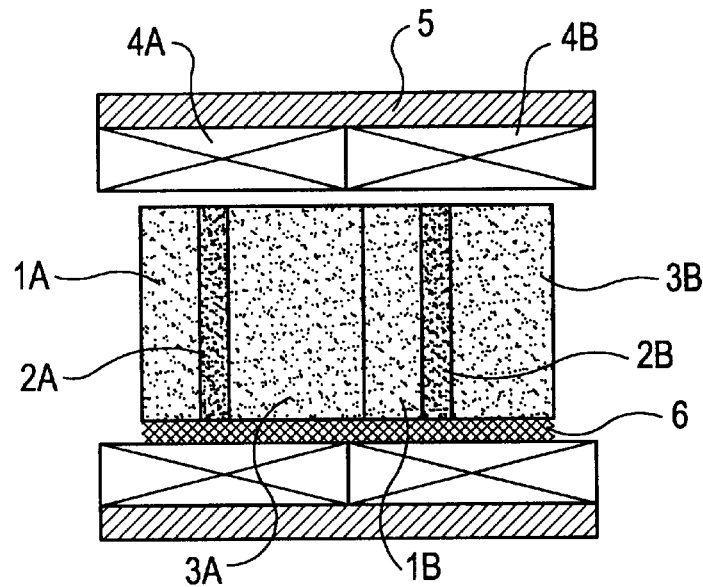
FIG. 1 is a sectional drawing showing a structure of an optical isolator in relation to the present invention.

Explanation of the present invention in relation to the attached drawing follows after the embodiment. Omitting redundant explanation, in this case, the same element is attached with the same code in a the explanation of the drawing.

FIG. 1 shows a sectional drawing showing a structure in case of using two Faraday rotators, in the isolator of the present invention, wherein each first and second birefringent crystal plates, 1A, 3A, 1B, and 3B, respectively, are installed on both sides of Faraday rotators, 2A and 2B. Those optical elements are independently assembled and adjusted and are integrally fixed with the light-transmitting adhesive. Ultraviolet curing resin or thermosetting resin is preferably used. The adoption of this structure enables down-sizing of an optical isolator unit and simplification of assembly work, which therefore allows accurate and easy assembly.

The thickness of second birefringent crystal plates, 3A and 3B, is designed to be $(1+\sqrt{2})$ times the thickness of the first birefringent crystal plates, 1A and 1B. The Faraday rotators, 2A and 2B, are magnetized by magnets, 4A and 4B, respectively,in opposite directions, at which the polarized wave aspects of transmitting light rotate by +45° and −45° respectively. Respective cylindrical magnets, 4A and 4B, are formed by a magnetic body such as ferrite or the like . The place of them are selected so that respective Faraday rotators, 2A and 2B, can be positioned at approximately midway between them.

The end faces of magnet, 4A and 4B, are integrally fixed with adhesive, which allows accurate and easy assembly of the subsequent stage.

In such a manner, forming integrally the plurality of magnets simplifies the fixing work with adhesive 6 by inserting the optical isolator unit composed of integrally formed optical elements into an integrally formed cylinder-type magnets, followed by adjustment to a predetermined position.

Lastly, the cicumference of the cylinder-type magnet is covered with a metallic cylinder-type housing body 5, followed by fixing with an adhesive. The cylinder-type housing body holds the magnets and the spacers inside at a predetermined position and protects them.

Figure 2:
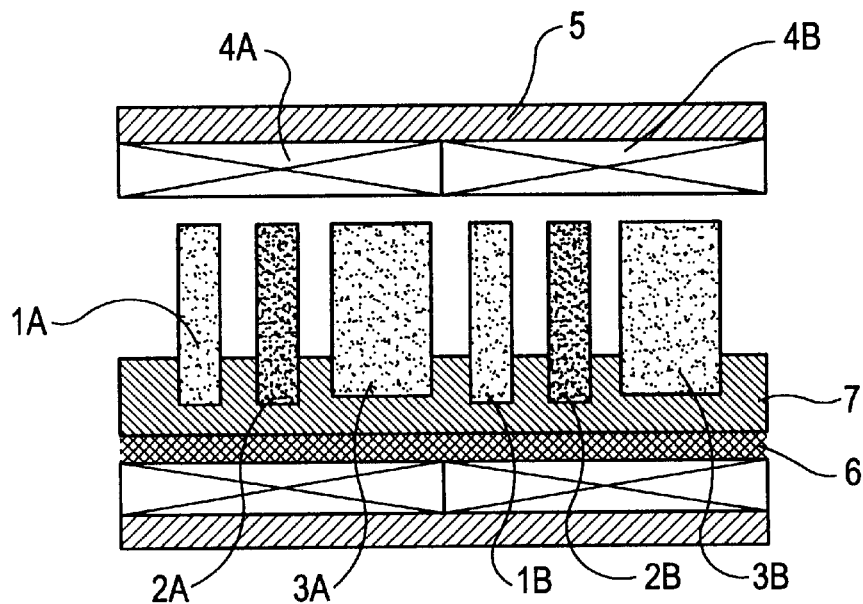
FIG. 2 is a sectional drawing showing another structure of an optical isolator in relation to the present invention.

FIG. 2 is a sectional drawing showing another structure of an optical isolator in relation to the present invention. The above-mentioned Faraday rotators, 2A and 2B, and birefringent crystal plates, 1A, 3A, 1B, and 3B, are inserted into slots which are processed on the surface of silicon substrate 7 in the form of a comb. Since the adhesive is not used in a path through which light passes these optical elements, the light path is not shut by the burning or alteration of the adhesive caused by transmitting light even if high energy light is transmitted, and reliability is high. Other points of this embodiment are the same as shown in FIG. 1.

Figure 3:
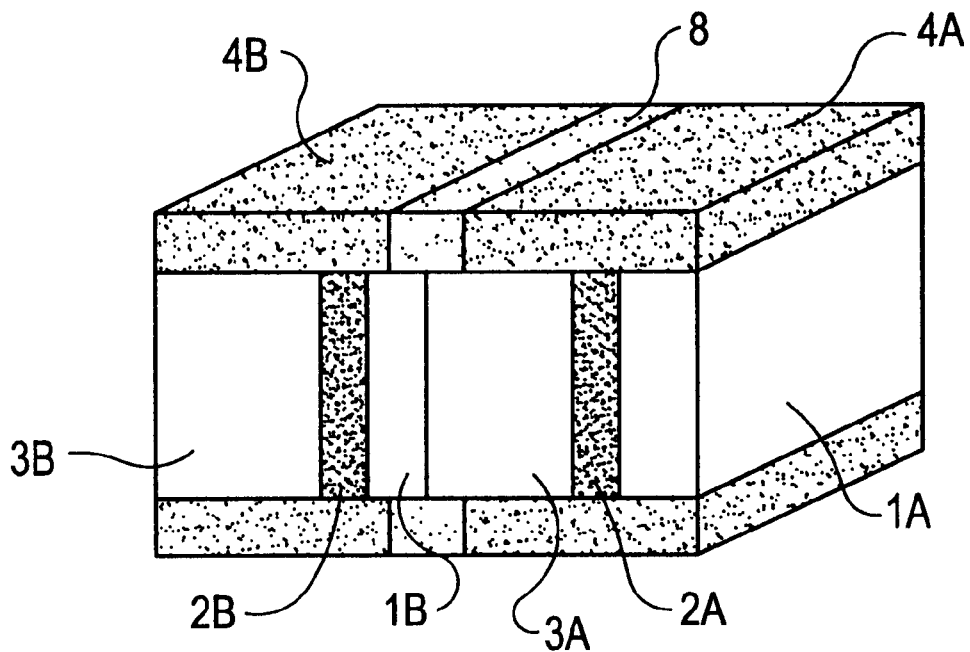
FIG. 3 is a perspective drawing showing a main body's structure of an optical isolator formed integrally.

A square tube or plate is used for the magnets other than a cylinder. FIG. 3 shows an example of main body's structure of an optical isolator formed integrally using rectangle plates. By combining these forms, application can be made for various requirements.

Figure 4:
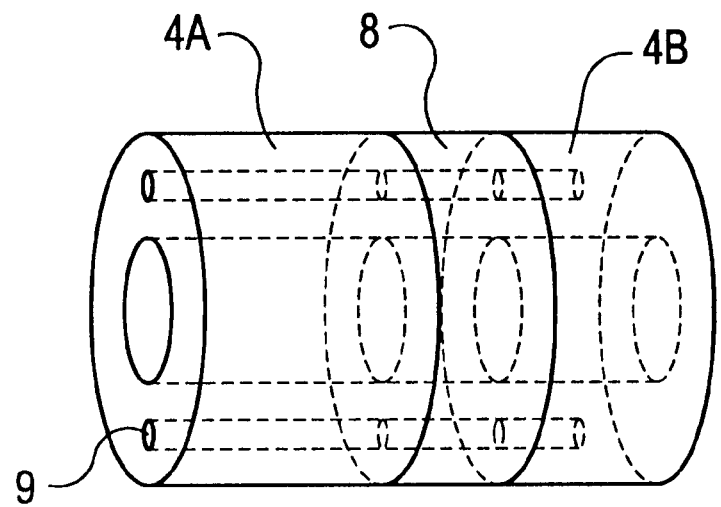
FIG. 4 is a drawing showing a structure of an integrally formed magnets.

FIG. 4 shows a case of an integrally formed magnets in which magnetic spacer 8 is arranged between cylindrical magnets, 4A and 4B, where they are integrally fixed by screws 9. The spacer is preferably made of magnetic body. The spacer 8 is arranged between magnets and adjusted so that the Faraday rotators are positioned at the center of each magnet. As physical means fixing other than with screws, welding or adhesive can be applied.

Figure 5:
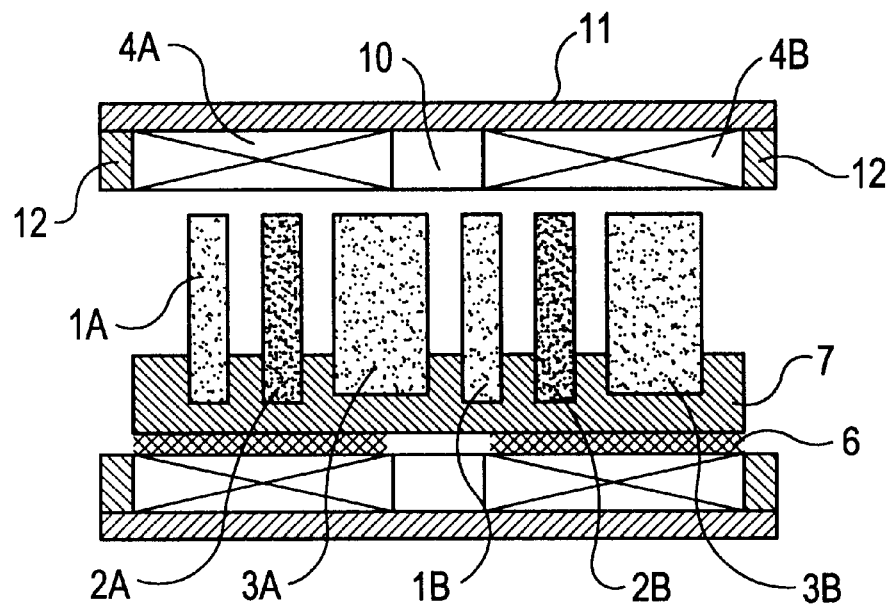
FIG. 5 is a drawing showing another structure of an optical isolator in relation to the present invention.

FIG. 5 shows a sectional drawing of a structure of another optical isolator in relation to the present invention, which forms a housing body by providing a ring-shape collar 12 on both ends of a cylindrical body 11 made of metal such as soft-iron, etc. After inserting magnets, 4A and 4B, into a cylindrical body 11 preserving a clearance 10, the collar 12 is fixed. Both ends of the inserted magnets, 4A and 4B, are securely fixed at the collar 12, which is effective when both magnets are arranged so that repulsion is generated. Indeed, there may be a case of introducing a spacer 8 to a position of clearance 10.

Figure 6:
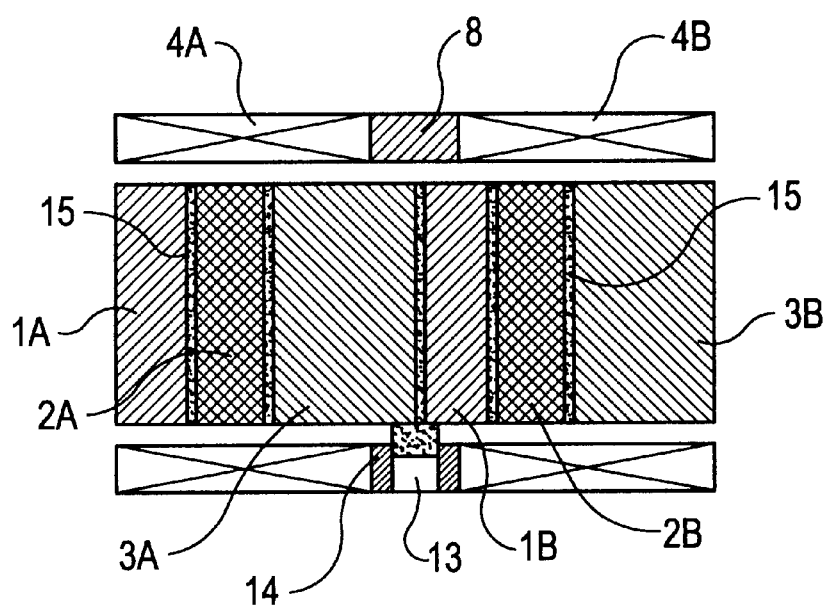
FIG. 6 is a sectional drawing showing another main body's structure of an optical isolator in relation to the present invention.
Figure 7:
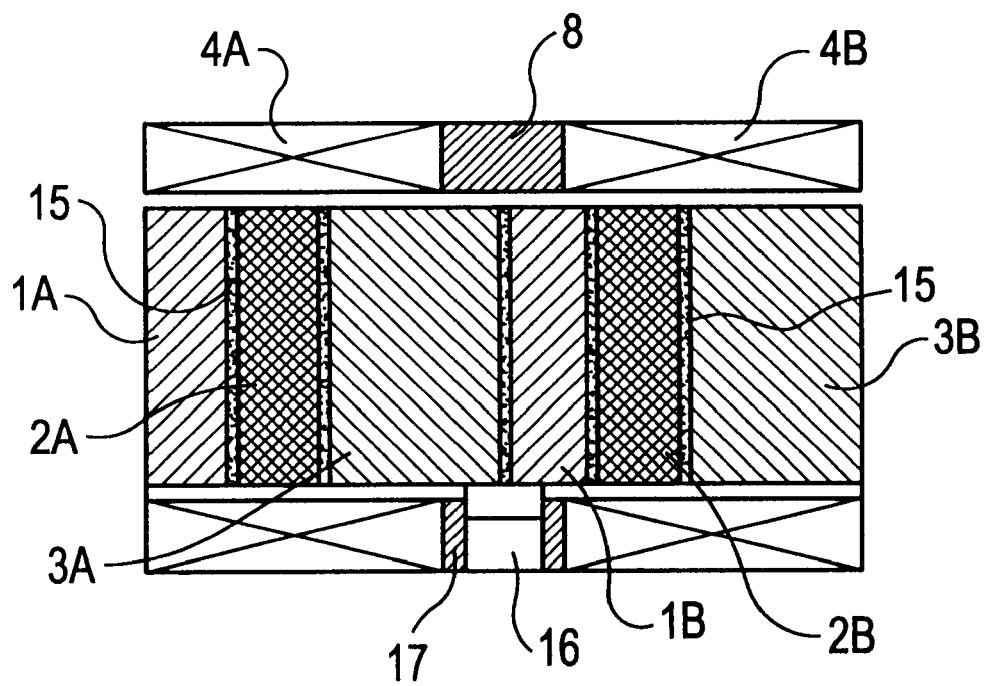
FIG. 7 is a sectional drawing showing another main body's structure of an optical isolator in relation to the present invention.

FIG. 6 and FIG. 7 show sectional drawings of a main body's structure of another optical isolator. In FIG. 6, optical elements and magnets are fixed by passing a screw 14 through a screw hole 13 provided in a cylinder-type spacer 8. Each optical element is integrally fixed with these contact surfaces by use of an ultraviolet curing resin 15, while a spacer 8 as well as magnets, 4A and 4B, are also fixed by use of a thermosetting adhesive.

FIG. 7 shows a structure as shown in FIG. 6, in which a hole 16 is provided in a cylinder-type spacer 8, and optical elements and magnets are fixed by applying an adhesive 17 in this hole. Others are the same as those in FIG. 6.

Figure 8:
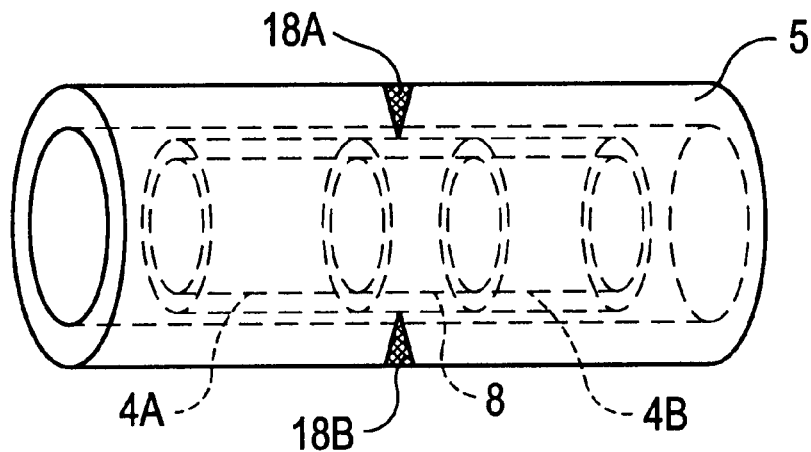
FIG. 8 is a drawing showing a structure of a housing body and an integrally formed magnets.
Figure 9:
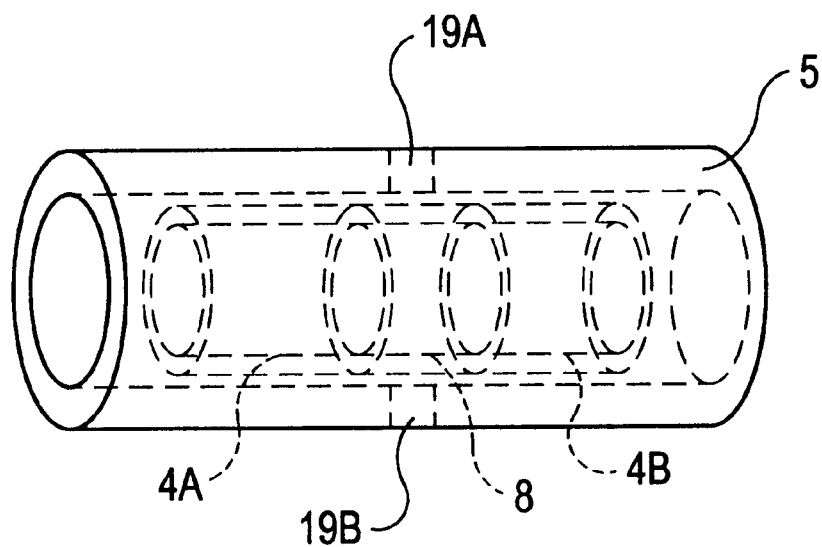
FIG. 9 is a drawing showing another structure of a housing body and an integrally formed magnets.
Figure 10:
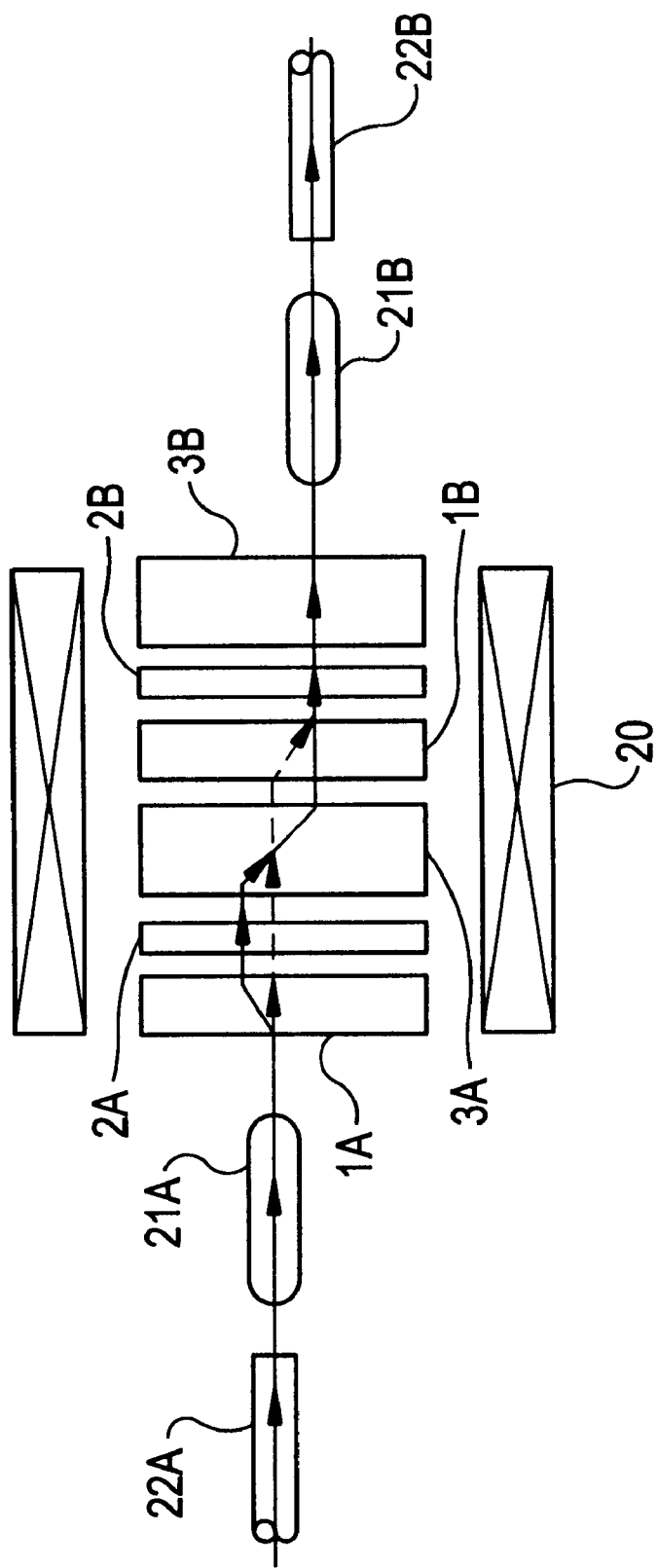
FIG. 10 is a drawing describing a conventional optical isolator.

FIG. 8 and FIG. 9 show a structure of integrally formed magnets, 4A and 4B, and a spacer 8 which are integrally fixed in a cylindrical-type housing body 5. FIG. 8 shows that the housing body 5 and the spacer 8 (even the magnets 4A and 4B may suffice this need) are subjected to direct through-welding, 18A and 18B, by use of a YAG laser, etc.

Furthermore, FIG. 9 shows that, by providing holes 19A and 19B on a housing body 5, the housing body and the magnets are fixed by physical means such as welding, adhesive or screws through this hole. When making the optical isolator as shown in FIG. 1 by use of the method described above, favorable characteristics were obtained with an insertion loss of 0.1 dB and an isolation of 60 dB.

What is claimed is:

1. An optical isolator, comprising:
    an optical isolator unit having a plurality of optical elements including at least two Faraday rotators and a plurality of birefringent crystal plates, the plurality of optical elements being arranged such that at least one birefringent crystal plate is positioned on either side of each Faraday rotator;
    a plurality of magnets arranged on a circumference of the Faraday rotators for magnetizing the Faraday rotators, the plurality of magnets being fixed to a spacer positioned between the magnets;
    a housing body arranged on the circumference of the plurality of magnets, the optical isolator unit being fixed to the plurality of magnets; and
    a substrate positioned within the plurality of magnets, respective optical elements being inserted into slots provided on a surface of the substrate.

2. An optical isolator as claimed in claim 1, wherein the plurality of magnets are fixed to the spacer by physical means selected from a group consisting of welding, screws, or adhesive.

3. An optical isolator as claimed in claim 1, wherein the optical isolator unit and the plurality of magnets are fixed together by physical means selected from a group consisting of welding, screws, or adhesive.

4. An optical isolator as claimed in claim 1, wherein the housing body is formed from a cylinder or cylinders having collars on both ends.

5. An optical isolator, comprising:
    an optical isolator unit having a plurality of optical elements including at least two Faraday rotators and a plurality of birefringent crystal plates, the plurality of optical elements being arranged such that at least one birefringent crystal plate is positioned on either side of each Faraday rotator;
    a plurality of magnets arranged on a circumference of the Faraday rotators for magnetizing the Faraday rotators, the plurality of magnets being fixed to a spacer positioned between the magnets, the spacer being made of a magnetic body; and
    a housing body arranged on the circumference of the plurality of magnets, the optical isolator unit being fixed to the plurality of magnets.

6. An optical isolator as claimed in claim 5, wherein the plurality of optical elements are adhered to each other by use of a light-transmitting adhesive.

7. An optical isolator, comprising:
    an optical isolator unit having a plurality of optical elements including at least two Faraday rotators and a plurality of birefringent crystal plates, the plurality of optical elements being arranged such that at least one birefringent crystal plate is positioned on either side of each Faraday rotator;
    a plurality of magnets arranged on a circumference of the Faraday rotators for magnetizing the Faraday rotators, wherein the plurality of magnets are configured so as to be fixed to a spacer positioned between the magnets, and
    a housing body arranged on the circumference of the plurality of magnets,
    wherein the optical isolator unit is fixed to the plurality of magnets, and the housing body and the configured magnets are joined together at the spacer such that the magnets are fixed to the housing at a through-hole provided on the housing body or nearby the hole by physical means selected from a group consisting of welding, screws, or adhesive.

8. An optical isolator, comprising:
    an optical isolator unit having a plurality of optical elements including at least two Faraday rotators and a plurality of birefringent crystal plates, the plurality of optical elements being arranged such that at least one birefringent crystal plate is positioned on either side of each Faraday rotator;
    a plurality of magnets arranged on a circumference of the Faraday rotators for magnetizing the Faraday rotators, wherein the plurality of magnets are configured so as to be fixed to a spacer positioned between the magnets, and
    a housing body made of metal arranged on the circumference of the plurality of magnets,
    wherein the optical isolator unit is fixed to the plurality of magnets, and the housing body and the configured magnets are joined together at the spacer such that the magnets are fixed to the housing by through-welding.

9. An optical isolator, comprising:

an optical isolator unit having a plurality of optical elements including at least two Faraday rotators and birefringent crystal plates, the plurality of optical elements being arranged such that at least one birefringent crystal plate is positioned on either side of each Faraday rotator;

a plurality of magnets arranged on the circumference of the Faraday rotators for magnetizing the Faraday rotators, the plurality of magnets being configured in a manner selected from a group consisting of: coupled to each other, fixed relative to each other with a spacer positioned between the magnets, and fixed relative to each other with a clearance between the magnet;

a housing body arranged on the circumference of the plurality of magnets, the housing body being made of metal, such that the housing body and the configured magnets are fixed together at the place of the magnet or the spacer, the optical isolator unit is directly fixed to the plurality of magnets, and the magnets are fixed to the housing by through-welding.

* * * * *